Nov. 11, 1958  F. S. RAPASKY  2,860,230
FASTENING MEANS AND METHOD

Filed Jan. 4, 1955  2 Sheets-Sheet 1

*INVENTOR.*
FRANCIS S. RAPASKY

BY G. H. Palmer
V. F. Dames
ATTORNEYS

Nov. 11, 1958   F. S. RAPASKY   2,860,230
FASTENING MEANS AND METHOD
Filed Jan. 4, 1955   2 Sheets-Sheet 2
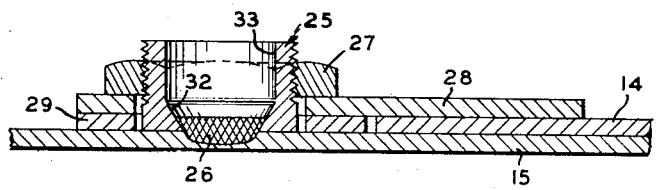
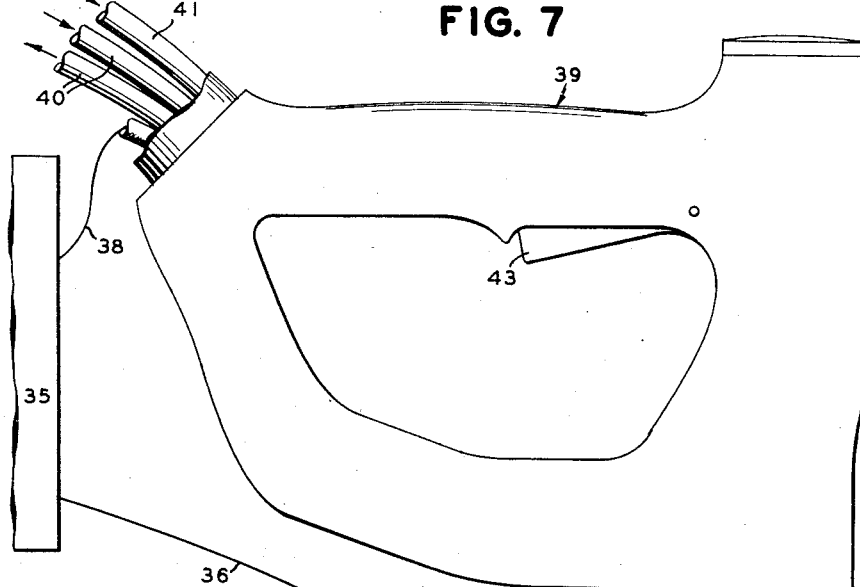
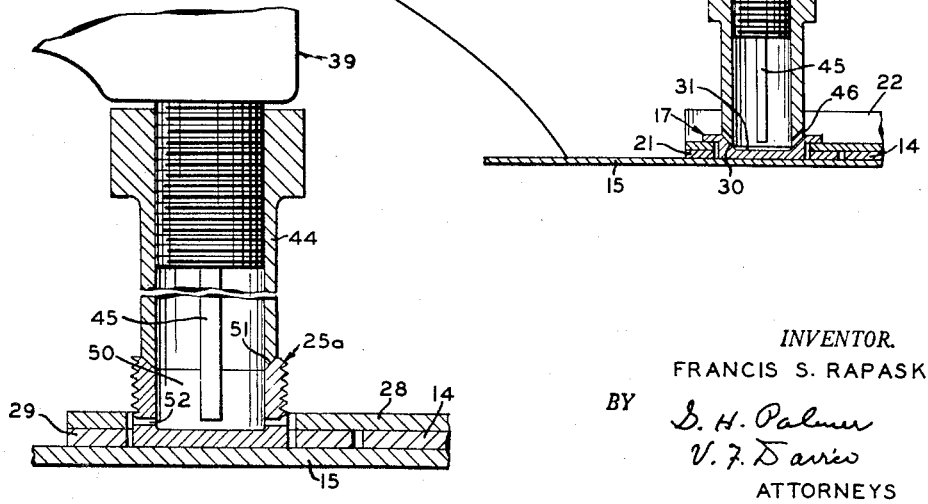
INVENTOR.
FRANCIS S. RAPASKY
BY
S. H. Palmer
V. F. Davies
ATTORNEYS United States Patent Office 2,860,230
Patented Nov. 11, 1958

2,860,230

FASTENING MEANS AND METHOD

Francis S. Rapasky, Linden, N. J., assignor to The M. W. Kellogg Company, Jersey City, N. J., a corporation of Delaware Application January 4, 1955, Serial No. 479,747

9 Claims. (Cl. 219—94)

This invention relates to the fastening of metal pieces and in particular to a method and fastening means for fastening pieces one to another through an attachment member that is fusion spot welded to one of the pieces.

When fabricating, erecting, or assembling apparatus and machines, or parts thereof, it is often desirable to fix metal pieces, either permanently or removably, through fastening means which include a member united to and carried by one of the pieces. Numerous arrangements have come into use to satisfy this need. Such arrangements at present in common use usually include a bolt or similar member which is threaded into or otherwise mechanically attached to the carrying piece. The shank of the bolt in these arrangement passes through a circular hole or a slot in another of the pieces and through an enlarged head, or a nut screwed on the shank, holds said other of said pieces fixed in position or limits the movement thereof to a fixed line or a fixed plane. In an effort to reduce the cost and to simplify the assembly, it has been proposed to replace the mechanically attached bolt by a stud united to the carrying piece by fusion welding which may be achieved by either arc welding or gas welding. "Nelson" type studs and stud welding have been proposed and have been found suitable in some applications. "Nelson" type studs and stud welding have important limitations which disqualify them from general use. "Nelson" studs and stud welding require expensive parts preparation prior to their application, the studs themselves are special studs and hence expensive, and furthermore, considerable skill is required on the part of the operator to obtain satisfactory results. Aside from the relatively high cost, studs of the "Nelson" type cannot be applied to work requiring reasonably close tolerances. Furthermore, unless special precautions are taken, it is not always possible to avoid fusing the pieces of the arrangement together when the stud is welded in place.

It is the primary object of the invention to provide a simple and cheap solution of the problem which can be practiced by comparatively unskilled labor with simple equipment and minimum preparation of the work pieces to invariably produce strong stud joints with the possibility of working within comparatively close talerances and without risk of welding pieces together at the stud joints.

In accordance with the invention, I provide an attachment piece, a stud or button, or the like, having a cavity therein opening at the top thereof which can be entered by a welding element. The thickness of wall between the bottom of the cavity and the bottom face of the attachment piece being such as to supply all the metal required from the attachment piece to provide a satisfactory joint, said wall thickness being such as to permit under the welding conditions chosen, the fusion of a sufficient depth of metal of the piece to which the attachment piece is welded to form a satisfactory joint of required strength. The bottom of the cavity is preferably flat and of a size to approximately define the area thereof that should be fused under the chosen welding conditions to provide a satisfactory weld nugget. It is also contemplated in accordance with the invention, to produce the spot weld nugget by a welding procedure which includes the use of a welding tool that automatically releases the current necessary for the spot weld, said tool including a nozzle or end which is adapted to be positioned against the attachment piece to facilitate the welding, the cavity in the attachment piece is formed and shaped to receive and automatically centralize said nozzle or end.

It is a primary object of this invention to provide a novel method and a novel means for fastening pieces together through a member that is united to one of the pieces, the member being so formed as to facilitate the formation of a strong fusion spot weld between it and the carrying piece and as to assure a predetermined relation relative to the carrying piece.

It is a further object of the invention to provide a novel method and a novel fastening means for fastening pieces together through a member that is fusion spot welded to one of the pieces, said member including a cavity enterable by the welding tool to effect the spot welding, and of such a depth as to include a bottom wall of a thickness sufficient to provide the metal required of the member to effect a satisfactory spot weld and to permit the fusion of the metal required from the piece therebeneath for the same purpose, said cavity being so shaped that its floor defines the area thereof to be fused for the required results and will readily accept the welding tool and center it therein.

It is also a primary object of the invention to provide a fastening member adapted for fusion spot welding to a carrying member which includes a central cavity shaped to permit entry of a welding tool and provided with a floor of a shape and size approximately equal to the area thereof required to be fused in forming a weld nugget sufficient to strongly unite the fastening member to the carrying member, the thickness of metal of said fastening member beneath said floor being sufficient to provide the weld metal required of said fastening member to form said nugget.

The further features, objects, and advantages of the invention will be apparent from a consideration of the following detailed description thereof taken with the accompanying drawings in which:

Fig. 6 is a view similar to Fig. 2 but showing a still further alternate construction;

Fig. 7 is a diagrammatic view illustrating the manner in which the welding is performed; and Fig. 8 is a view similar to Fig. 7 illustrating a modified operation.

The invention is of general utility but for the purposes of this application it will be disclosed in connection with fastening arrangements wherein a latch piece is carried on a stud-like member that is united to the fixed element of the arrangement.

The components of the fastening arrangements of the invention are of metal whose composition is dictated by the requirements of the service. However, the composition of at least the stud-like member and the fixed element must be weldable. Specifically, the invention will be disclosed in connection with fastening arrangements employed in interconnecting the elements of a fractionating tray in a petroleum treating tower.

Figure 1:
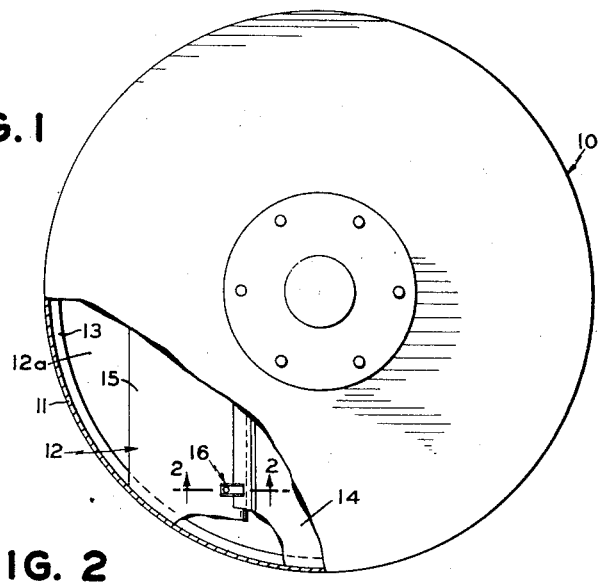
Fig. 1 is a plan view of a petroleum treating tower with parts broken away to better show details of the internal construction.

The petroleum refining tower or column 10 which may be of any of the conventional types includes the cylindrical wall or shell 11. The tower 10 may be of any desired construction, diameter, and height and as indicated fragmentarily in Fig. 1 may be a bubble tower type, the usual risers and bubble caps, and the like, have been omitted in order not to unnecessarily complicate the disclosure. The conventional petroleum refining tower 10 includes a plurality of superimposed trays or decks 12, only one being shown, which extend transversely across the interior of the tower and are spaced apart in a predetermined manner. The invention is particularly directed to arrangements for holding the sections of the tray 12 in predetermined position. The tray 12 is supported within the tower 10 by an annular ring 13 which is welded or otherwise secured to the tower wall 11. The tray 12 is made up of a plurality of plates or sections, the two sections 14 and 15 only being shown, which are fastened in any preferred way, not shown, to the ring 13. The tray plates or sections do not completely cover the cross-section of the tower 10, a small peripheral section 12a is left uncovered to provide for a down comer, preferably of the weir type. The sections 14 and 15 are of light gauge material which usually is a corrosion resistant material such as chromium or chrome-nickel steel although it may be carbon steel or any other material preferred for the service.

The sections 14 and 15 extend transversely across the tower and are arranged in parallel relation with contiguous portions thereof overlapping to provide for mutual reinforcement and for the attainment of a substantially continuous floor. The floor sections 14 and 15 are releasably clamped together through the clamp arrangements 16 which restrain the sections 14 and 15 against movement longitudinally of the tower axis but permit transverse movement so as to allow for expansion and contraction during operation.

Figure 2:
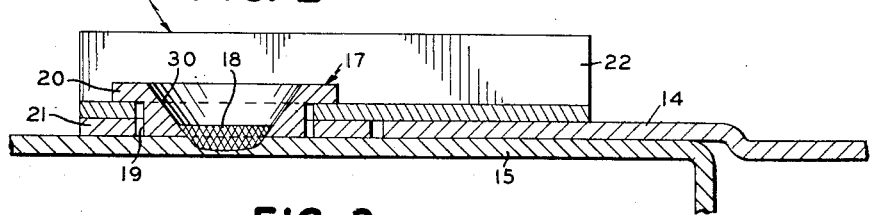
Fig. 2 is a sectional view taken on line 2—2 of Fig. 1 but on an enlarged scale.
Figure 5:
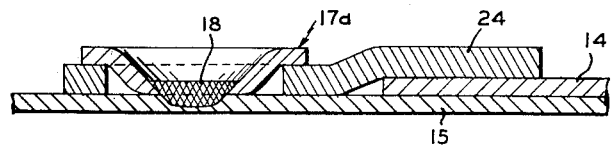
Fig. 5 is a sectional view showing an alternate form of attachment piece.

The clamping arrangement 16 includes a stud, or button, 17 which is united by the weld nugget 18 to the floor section 15. The button 17 has a cylindrical shank portion 19 which carries at its upper end the outwardly extending shoulder portion 20. As shown in Fig. 2, the shank portion 19 passes through a circular hole in a washer member 21 and through a circular hole in a clamp, or latch, piece 22. The shank portion 19 supports the clamp piece 22 for rotation about the center of the button 17 while the shoulder portion 20 limits the movement of the clamp piece 22 to the rotation movement mentioned. The washer 21 is of substantially the same thickness as the floor piece 14 and is employed to facilitate the latching function of the clamp piece 22. The button 17 may be formed in various ways, as for instance by casting, machining, or stamping. The buttons 17 shown in Figs. 2, 3, 4 and 7 are formed by a machining operation, whereas the button 17a as shown in Fig. 5 is formed by a pressing or stamping operation.

Figure 3:
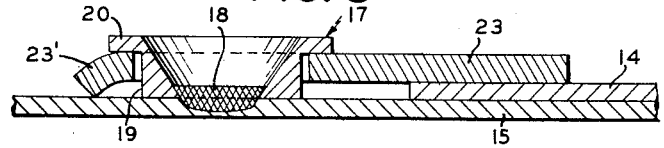
Figs. 3 and 4 are sectional views similar to Fig. 2 but showing alternate constructions.
Figure 4:
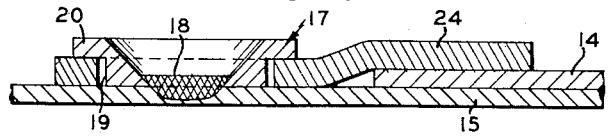

In Fig. 3, the washer 21 is eliminated but to assure proper clamping the clamping piece 23 is made thicker than the clamping piece 22 of Fig. 2 and its short end 23' is curved to carry it into contact with the floor section 15 when in the clamping position. In the variation shown in Fig. 4, the shank 19 of the button 17 is somewhat shorter than that of the buttons 17 of either Figs. 2 and 3 while the clamping piece 24 is approximately the same thickness as the clamp piece 23 of Fig. 3. To permit the proper engagement of the edge of the section 14, the clamp piece 24 is bent as shown. When the clamping piece 22, 23 or 24 is to be moved into or out of its latching or clamping position by longitudinal movement rather than by rotation, the hole in said clamping piece will be in the form of one or more slots and one or more buttons 17 will be employed whose shanks 19 will be shaped to provide surfaces which while they permit the desired movement restrain all other movement of said clamping piece. When it is desired to fasten a member in position without permitting it any freedom of movement, the shank 19 of the button 17 may be of a triangular or polygonal configuration and the hole in the retained member through which the shank 19 passes, of the complementary configuration.

It is also possible to employ a button 17 which does not include the shoulder portion 20 and performs the same function as the shoulder portion 20 by reason of a nut carried on its threaded shank. Such a button 25 is shown in Fig. 6. The button 25 is united to the floor section 15 through a weld nugget 26. The shank of the button 25 is threaded to accommodate the nut 27 which serves to hold a latch piece 28 in position on the washer 29 and permits the rotation of the latch piece 28 about the shank thereof.

The buttons 17 and 25 are characterized by the hollow central portions thereof. These central hollows are each of a shape and a size to permit the entry thereinto of a welding tool or welding element. Thus, the central hollow 30 of the button 17 is comparatively shallow and is frusto-conical in shape, the cone angle being such as to permit easy access of the welding tool to the floor 31. The floor 31 is preferably defined by a plain circular surface of such size as to be substantially equal in extent to the top face of the weld nugget required to securely unite the button 17 to the floor plate 15. In the case of the button 26, the frusto-conical cavity 32, of the same character as the cavity 30 will merge into a cylindrical bore 33 to provide the length of shank required. The diameter of the base of the frusto-conical cavity 32 and diameter of the bore 33 will be determined by the size of the welding tool and the type of welding operation.

The welding nugget 18, or 26 as the case may be, may be deposited in various ways. Thus, it may be deposited by a gas welding operation or by an arc welding operation. It is at present preferred to deposit the weld nugget by an arc welding operation in which a noble gas such as helium or argon, or a mixture thereof, is employed as the shielding medium, as this type of operation is quiet, easily controlled in its effects, produces excellent weld metal, and generally involves comparatively low current values and inexpensive apparatus. In this type of operation, it is at present preferred to employ an automatic arrangement through which a current of predetermined amperage and voltage is discharged for a predetermined length of time automatically to effect each weld. Apparatus for carrying out this operation is at present available commercially; one such apparatus being sold by Linde Air Products Company of New York, N. Y., as the "Heliarc Spot Welding Torch" bearing designation HW—8. A similar apparatus is sold by Air Reduction of New York, N. Y., under their registered trademark of "Aircospot Gun" Model No. 202. These apparatus are each characterized in that they include current supply and current regulating arrangements which are intended to supply current at a predetermined amperage and voltage for a predetermined time at each weld location. The apparatus employ a non-consumable tungsten electrode which is shielded during the operation by an atmosphere of a noble gas such as helium, argon, or a mixture thereof, but preferably helium. Each of these apparatus includes a hand welding "gun" device having a nozzle-like arrangement encircling the discharge end of the tungsten electrode which is adjustable relative to the end of the tungsten electrode so that by positioning said nozzle against the work, a predetermined spacing between the electrode and the work surface is obtained.

An apparatus of this type is schematically shown in Fig. 7. The rectangular structure 35 represents a control box which houses the current supply source and the various arrangements for predeterminedly setting the amperage, and the voltage of the current and the length of time of the current discharge. The control box 35 is connected by a cable 36 to the work piece 15 and through a cable 38 to the welding gun 39. The gun 39 is coiled by circulating water therethrough; the water enters through one of the conduits 40 and leaves through the other. Helium, or other noble gas, is supplied to the welding gun 39 through a conduit 41. The gun 39 includes a switch operating trigger 43 through which the initiation of the electric current discharged is effected. The gun 39 includes a nose or nozzle 44 which as shown screw threadedly engages at its upper end the body of the gun 39 so that by rotating the nozzle 44 it may be adjusted longitudinally relative to the end of electrode 45. The electrode 45 is non-consumable and is preferably made of tungsten. The noble gas, helium, introduced through the conduit 41 flows through the annular space between the nozzle 44 and the electrode 45 to assure the proper flow of the shield gas in the region of the end of the electrode 45, the nozzle 44 includes a plurality of slots or notches 46 in the periphery thereof.

In attaching the button 17 to the work piece 15, Fig. 7, the button 17 is placed in position on the work piece 15 with the clamp piece 22 positioned as shown. The controls of the panel 35 are set to provide for a current discharge of the desired voltage and amperage and for a time sufficient to provide the required weld nugget. After this the trigger 43 is squeezed and the current flow triggered off. The flow of current will melt the metal constituting the floor of the button 17 and a quantity of the metal of the work piece 15 therebeneath to form a weld nugget which firmly unites the button 17 to the work piece 15. It is also contemplated to effect the fusion of the weld nugget by two or more sequentially applied welding current discharges of less duration and intensity than the single discharge required for the nugget formation when conditions warrant.

To assure a proper weld nugget as well as a proper union between the button 17 and the work piece 15, Fig. 7, the thickness of the metal wall between the floor 31 and the bottom of the button 17 is made such that it will be fused throughout the full depth thereof by the predetermined electric current discharge to supply all the metal required of it for forming a proper joint and weld nugget while at the same time it will permit sufficient heat to be transmitted to the work piece 15 therebeneath to fuse out of said work piece the metal required from it to produce a proper joint and weld nugget. With helium as the shielding gas, with voltages within the range of from 70 to 80 volts, and amperages within the range of from 100 to 250 amperes, and for discharge times ranging from .33 to 1.6 seconds, it is found that the thickness of the metal between the floor 31 and the bottom of the button 17 should preferably not exceed ⅛ of an inch. Generally speaking, high amperages and short discharge times are preferred over low amperages and long discharge times for although the wattages may be equal, the higher amperages provide for better penetration and steeper heat gradients and thus assure proper fusion of the metal of the work piece to which the bottom 17 is to be united.

In a specific example, using helium as the shielding gas, a button 17 was employed whose outside diameter at the shoulder 20 was ⅞ of an inch, whose shank diameter was ⅝ of an inch, and the thickness of metal between the floor 31 and the bottom of the button 17 was 1/16 of an inch. The shank 19 of this button 17 was approximately ⅛ of an inch high and the floor 31 had a diameter of approximately ⅜ of an inch. The conical sides of the hollow 30 were sloped at approximately 45° to the vertical. A satisfactorily strong union of this button 17 to the work piece 15 was obtained and a proper weld nugget provided by a discharge of 150 amperes at 70-80 volts for 0.6 second duration.

In welding the the button 25, the nozzle 44 of the welding gun 39 may be made to enter the central hollow of the button 25 and rest on the frusto-conical portion 32, as is done in connection with the button 17. In such case the nozzle 44 must be small enough to assure a proper circulation of the shielding gas or must include some expedient, as for instance, a plurality of longitudinal grooves (not shown) in its outside periphery sufficient for the purpose. An alternative way of achieving the welding and the proper circulation of the shielding gas is shown in Fig. 8. As shown in Fig. 8, the button 25a includes a cylindrical bore 50 which extends substantially the full length thereof while the bottom of the bore 50 may be tapered (frusto-conical), it need not be so since this type of button 25a is best suited to the automatic welding procedure above described and ordinarily is not used in hand controlled welding. The top end of the button 25a is tapered to provide a frusto-conical seat 51 upon which is adapted to be positioned the complementarily shaped end of the nozzle 44 to center said nozzle and the non-consumable electrode 45 relative to the button 25a. As before, the spacing of the electrode 45 from the bottom of the button 25a is adjusted by screwing the nozzle 44 up or down on the body of the gun 39. To assure proper circulation of the shielding gas in the weld area one or more holes 52 are provided in the wall of the button 25 adjacent the bottom thereof.

While it is at present preferred to employ the noble gas shielded, non-consumable electrode, automatic welding procedure disclosed above, it is also possible to successfully employ the same procedure but with a consumable instead of a non-consumable electrode. When using a consumable electrode, the electrode is in the form of a fine wire of a composition suitable to produce a weld nugget of required analysis. The wire is thin being in the order of 1/32 of an inch diameter and less, and is supplied to the arc at a controlled rate for a controlled period so that in this operation a definite quantity of wire electrode is supplied during the time set for current discharge.

Although many changes can be made by those skilled in the art without departing from the scope of the invention, it is intended that all matter contained in the above description and appended claims and shown in the accomanying drawings shall be interpreted as illustrative and not limitative.

I claim:

1. A metal attachment piece adapted to be united by a weld metal nugget to a metal member, said attachment piece including a hollow cylindrical body open at one end to permit entrance thereinto of a welding instrumentality and closed at the other end by a wall adapted to be positioned on said member, the hollow of said cylindrical body made up of a cylindrical portion and a portion defined by a frusto-conical surface adapted to receive a similar surface of a welding instrumentality thereon to center said instrumentality relative to said attachment piece, said wall of a thickness controlled to permit fusion, when said attachment piece is positioned on said member, by passage of heat therethrough of metal of the full thickness of said wall and metal of said member in quantity sufficient to form a uniting weld nugget.

2. In combination a metal attachment piece including a hollow body open at one end and closed at the other end by a wall adapted to be positioned on the member to which said piece is to be united, said hollow body including position determining means spaced from said wall and bearing a fixed relation relative to said wall, and a welding instrumentality adapted to enter the hollow of said body to perform a welding operation therein, said welding instrumentality including a welding element, and position determining means bearing a fixed relation relative to said element, said position determining means of said hollow body and said welding instrumentality being complementary each to the other whereby when they are juxtaposed said welding element is predeterminedly positioned relative to said wall.

3. In combination a metal attachment piece including a hollow body open at one end and closed at the other end by a wall adapted to be positioned on the member to which said piece is to be united, said hollow body including an inclined hollow defining surface concentrically located relative to said wall, and a welding instrumentality adapted to enter the hollow of said body to perform a welding operation therein which includes fusion of metal of said wall and metal of the member to which said attachment piece is to be united, said welding instrumentality including a welding element and an inclined surface concentrically located relative to said welding element, said inclined surfaces being complementary whereby when they are juxtaposed said welding instrumentality is predeterminedly positioned relative to said metal attachment piece and said wall thereof.

4. In combination a metal attachment piece including a hollow body open at one end and closed at the other end by a wall adapted to be positioned on the member to which said piece is to be united, said hollow body including a frusto-conical hollow defining surface concentrically located relative to said wall, and a welding instrumentality adapted to enter the hollow of said body to perform a welding operation therein which includes fusion of metal of said wall, said welding instrumentality including a welding element and a frusto-conical surface concentrically located relative to said welding element, said inclined surfaces being complementary whereby when they are juxtaposed said welding instrumentality is predeterminedly positioned relative to said metal attachment piece and said wall thereof.

5. In combination a metal attachment piece including a hollow body open at one end and closed at the other end by a wall adapted to be positioned on the member to which said piece is to be united, the hollow of said body defined by a frusto-conical surface and a cylindrical surface aligned therewith, said surfaces concentrically located relative to said wall, and a welding instrumentality adapted to enter the hollow of said body to perform a welding operation therein which includes fusion of metal of said wall, said welding instrumentality including a welding element and means longitudinally adjustable relative thereto, said adjustable means including a frusto-conical surface concentrically located relative to said welding element, said frusto-conical surfaces being complementary whereby when they are juxtaposed said welding element is predeterminedly positioned relative to said wall.

6. The method of welding a metal attachment piece to a metal member which comprises positioning a metal attachment piece formed as a hollow body open at one end and closed at the other end by a wall of controlled thickness, on the metal member to which the attachment piece is to be united and with said wall in contact with said member, inserting a welding electrode into the hollow of said body, discharging electric current through a gap between the end of said electrode and said wall to fuse the full thickness of the metal of said wall and metal of said member to form a common molten pool which upon solidification forms a weld nugget integrally uniting said piece and said member, and controlling the characteristics of the electric current discharge and the duration thereof to produce a weld nugget of predetermined character.

7. The method of welding a metal attachment piece to a metal member which comprises positioning a metal attachment piece formed as a hollow body open at one end and closed at the other end by a wall of controlled thickness, on the metal member to which the attachment piece is to be united and with said wall in contact with said member, inserting a welding electrode into the hollow of said body, predeterminedly positioning the discharge end of said electrode relative to said wall and the sides of said body, discharging electric current through a gap between the end of said electrode and said wall to fuse the full thickness of the metal of said wall and metal of said member therebeneath to form a common molten pool which upon solidification forms a weld nugget integrally uniting said piece and said member, and controlling the quantity of heat generated by said discharge and the rate of generation thereof to produce a weld nugget of predetermined character.

8. The method of welding a metal attachment piece to a metal member as defined in claim 7, in which the gap through which the electric current is discharged and the adjacent regions of said piece and said electrode are shielded from the atmosphere by a blanket of inert gas chosen from the class made up of helium and argon.

9. The method of welding a metal attachment piece to a metal member as defined in claim 7, in which the electrode is substantially non-consumable and the discharge gap struck off its end as well as the regions of said piece and said electrode adjacent said gap are shielded by an atmosphere of inert gas chosen from the class made up of helium and argon.

References Cited in the file of this patent

UNITED STATES PATENTS

| 1,190,208 | Williams | July 4, 1916 |
|---|---|---|
| 1,592,605 | Ledwinka | July 13, 1926 |
| 1,858,883 | Cook et al. | May 17, 1932 |
| 1,876,811 | Whitworth | Sept. 13, 1932 |
| 1,890,093 | Neff | Dec. 6, 1932 |
| 2,108,409 | Pern | Feb. 15, 1938 |
| 2,156,298 | Leitner | May 2, 1939 |
| 2,156,306 | Rapatz | May 2, 1939 |
| 2,304,976 | Watter | Dec. 15, 1942 |
| 2,327,924 | Mounts | Aug. 24, 1943 |
| 2,345,037 | De Gray | Mar. 28, 1944 |
| 2,574,435 | Maxim et al. | Nov. 6, 1951 |

FOREIGN PATENTS

| 215,452 | Great Britain | May 12, 1924 |
|---|---|---|
| 866,131 | France | Apr. 7, 1941 |